US008365636B2

(12) United States Patent
Irikura et al.

(10) Patent No.: US 8,365,636 B2
(45) Date of Patent: Feb. 5, 2013

(54) AUTOMATIC TRACTION ENHANCEMENT FOR A TRANSAXLE

(75) Inventors: Koji Irikura, Hyogo (JP); Donald Wieber, Bean Station, TN (US)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 736 days.

(21) Appl. No.: 12/369,375

(22) Filed: Feb. 11, 2009

(65) Prior Publication Data
US 2009/0199678 A1 Aug. 13, 2009

Related U.S. Application Data

(63) Continuation-in-part of application No. 11/277,433, filed on Mar. 24, 2006, now Pat. No. 7,490,708, which is a continuation-in-part of application No. 11/090,097, filed on Mar. 28, 2005, now Pat. No. 7,493,998.

(51) Int. Cl.
*F16H 48/12* (2012.01)
(52) U.S. Cl. ........................................................ 74/650
(58) Field of Classification Search .................. None
See application file for complete search history.

(56) References Cited

U.S. PATENT DOCUMENTS

| | | | |
|---|---|---|---|
| 1,175,300 A | 3/1916 | Ross | |
| 2,191,763 A | 2/1940 | La Casse | |
| 2,481,066 A | 9/1949 | Bagge | |
| 3,173,309 A | 3/1965 | Seliger | |
| 3,310,997 A | 3/1967 | Biddle | |
| 3,447,396 A | 6/1969 | Seliger | |
| 3,472,349 A | 10/1969 | Ainsworth | |
| 3,581,597 A | 6/1971 | Reiersgaard | |
| 3,700,082 A | 10/1972 | Schwab | |
| 3,935,753 A | 2/1976 | Williams et al. | |
| 4,373,407 A | 2/1983 | Okubo | |
| 4,434,878 A | 3/1984 | Okubo | |
| 4,876,918 A | 10/1989 | Hudson | |
| 5,971,123 A | 10/1999 | Ochab et al. | |

(Continued)

FOREIGN PATENT DOCUMENTS

| | | |
|---|---|---|
| EP | 0 311 328 A2 | 4/1989 |
| EP | 1 707 837 A1 | 4/2006 |

OTHER PUBLICATIONS

European Search Report for European Application No. EP 08 25 0797, dated May 20, 2010 (3 pages).

(Continued)

*Primary Examiner* — David D Le
*Assistant Examiner* — Erin D Bishop
(74) *Attorney, Agent, or Firm* — Sterne, Kessler, Goldstein & Fox P.L.L.C.

(57) ABSTRACT

A transaxle for a working vehicle including a housing, an integrated hydrostatic transmission (IHT) disposed within the housing, and a bi-directional overrunning clutch disposed within the housing and coupled to an output shaft of the IHT. The bi-directional overrunning clutch includes an input gear having a central opening, a roller assembly disposed within the central opening of the input gear, a plurality of rollers for selective engagement with the input gear, and a pair of hubs. Each hub is disposed at least partially within the roller assembly. The transaxle further includes a pair of clutch covers. Each clutch cover is disposed at either end of the roller assembly and each clutch cover is coupled directly to the roller assembly. The bi-directional overrunning clutch further includes a pair of friction members. Each friction member is disposed between one of the hubs and respective clutch cover. The transaxle also includes a pair of shaft segments of a primary drive axle.

16 Claims, 15 Drawing Sheets

U.S. PATENT DOCUMENTS

| | | |
|---|---|---|
| 6,516,688 B2 | 2/2003 | Albertson |
| 6,629,590 B2 | 10/2003 | Ochab et al. |
| 6,655,515 B2 | 12/2003 | Cox et al. |
| 6,722,484 B2 | 4/2004 | Ochab et al. |
| 2003/0089570 A1 | 5/2003 | Ochab et al. |
| 2004/0011033 A1* | 1/2004 | Ishiii et al. .................. 60/487 |
| 2009/0011890 A1 | 1/2009 | Bawks |

OTHER PUBLICATIONS

European Search Report for European Application No. EP 06 25 1647, dated Jun. 30, 2006.

* cited by examiner

AUTOMATIC TRACTION ENHANCEMENT FOR A TRANSAXLE

CROSS REFERENCE TO RELATED APPLICATIONS

The present application is a Continuation-in-Part of U.S. patent application Ser. No. 11/277,433, filed Mar. 24, 2006, which is a Continuation-in-Part of U.S. patent application Ser. No. 11/090,097, filed Mar. 28, 2005, the disclosure of which is incorporated herein in its entirety by reference thereto.

BACKGROUND OF THE INVENTION

1. Field of the Invention

The present invention is related to clutches, and more particularly to a bi-directional overrunning clutch for controlling torque transmission to a primary drive axle of a working vehicle.

2. Background Art

Simple drive systems for two wheel drive working vehicles, e.g., lawn mowers, lawn vacuums, snow blowers, utility tractors, trimmers, edgers, concrete and asphalt cutters, and the like, typically include a drive shaft or belt connected to a single drive axle, which drives both drive wheels. The principal deficiency with this type of drive system is that the vehicle is inefficient during turning because the wheels rotate on a common shaft, and thus rotate at the same rate of speed.

For instance, when turning such a vehicle, the outer wheel must travel a greater distance than the inner wheel in the same amount of time. However, because the wheels rotate on a common shaft, the result is that differential rotation is not permitted, resulting in one of the wheels slipping or skidding. This slipping/skidding results in premature wear of the wheel, and damage to surfaces on which the vehicle is operating. A lawn mower with this type of drive system can damage the turf under the slipping wheel.

To eliminate this inefficiency, common drive systems for wheeled working vehicles generally provide a differential between the pair of drive wheels. The differential permits independent or differential rotation of the drive wheels on an axle when the vehicle turns. Differentials, however, have various disadvantages. For example, when one wheel losses traction with the ground, the conventional differential is unable to transmit torque to the opposite wheel. To address this problem, many differentials on the market today use some form of overrunning clutch, or differential lock, to transmit torque when needed to a driven shaft. One use of an overrunning clutch in an all terrain vehicle is disclosed in U.S. Pat. No. 5,036,939. In that patent, the vehicle incorporates overrunning clutches where the wheel hub mounts to the axle, thus allowing each wheel to independently disengage when required. Another use of an overrunning clutch in a differential is disclosed in U.S. Pat. No. 5,971,123, which describes an electromechanical, bi-directional overrunning clutch differential that addresses many of the problems inherent in the prior drive systems.

Another bi-directional overrunning clutch is described in U.S. Pat. No. 6,722,484 (hereinafter "the '484 patent"), which is hereby incorporated in its entirety by reference thereto. The bi-directional clutch of the '484 patent controls torque transmission to a primary drive axle through the use of a roller assembly, friction members and hubs. The bi-directional clutch of the '484 patent was designed and configured for use in light duty vehicles; e.g., snowblowers, lawnmowers, trimmers, etc. The '484 patent does not teach or suggest the use of such a bi-directional clutch in an integrated hydrostatic transmission (IHT). Nor does the '484 patent teach or suggest the use of such a bi-directional clutch in heavy-duty machinery, such as tractors, trucks, and other construction equipment, which require a more robust clutch configuration capable of withstanding higher stresses and loads than are typically encountered in light duty vehicles.

SUMMARY OF THE INVENTION

Disclosed herein is a transaxle for a working vehicle. In one embodiment, the transaxle includes a housing and an integrated hydrostatic transmission (IHT) disposed within the housing. The IHT generally comprises a hydraulic motor and a hydraulic pump. The transaxle further includes a bi-directional overrunning clutch disposed within the housing and coupled to an output shaft of the hydraulic motor. The bi-directional overrunning clutch includes an input gear having a central opening, a roller assembly disposed within the central opening of the input gear, a plurality of rollers for selective engagement with the input gear, and a pair of hubs. Each hub is disposed at least partially within the roller assembly. The transaxle further includes a pair of clutch covers. Each clutch cover is disposed at either end of the roller assembly and each clutch cover is coupled directly to the roller assembly. Each clutch cover extends over at least a portion of each hub. The bi-directional overrunning clutch further includes a pair of friction members. Each friction member is disposed between one of the hubs and respective clutch cover. The transaxle also includes a pair of shaft segments of a primary drive axle. Each shaft segment is coupled to one of the hubs. Various transaxle embodiments and a method of assembling the transaxle are also disclosed.

BRIEF DESCRIPTION OF THE DRAWINGS/FIGURES

The accompanying drawings, which are incorporated herein and form part of the specification, illustrate embodiments of the present invention and, together with the description, further serve to describe and enable a person skilled in the relevant art to make and use the present invention.

Figure 10:
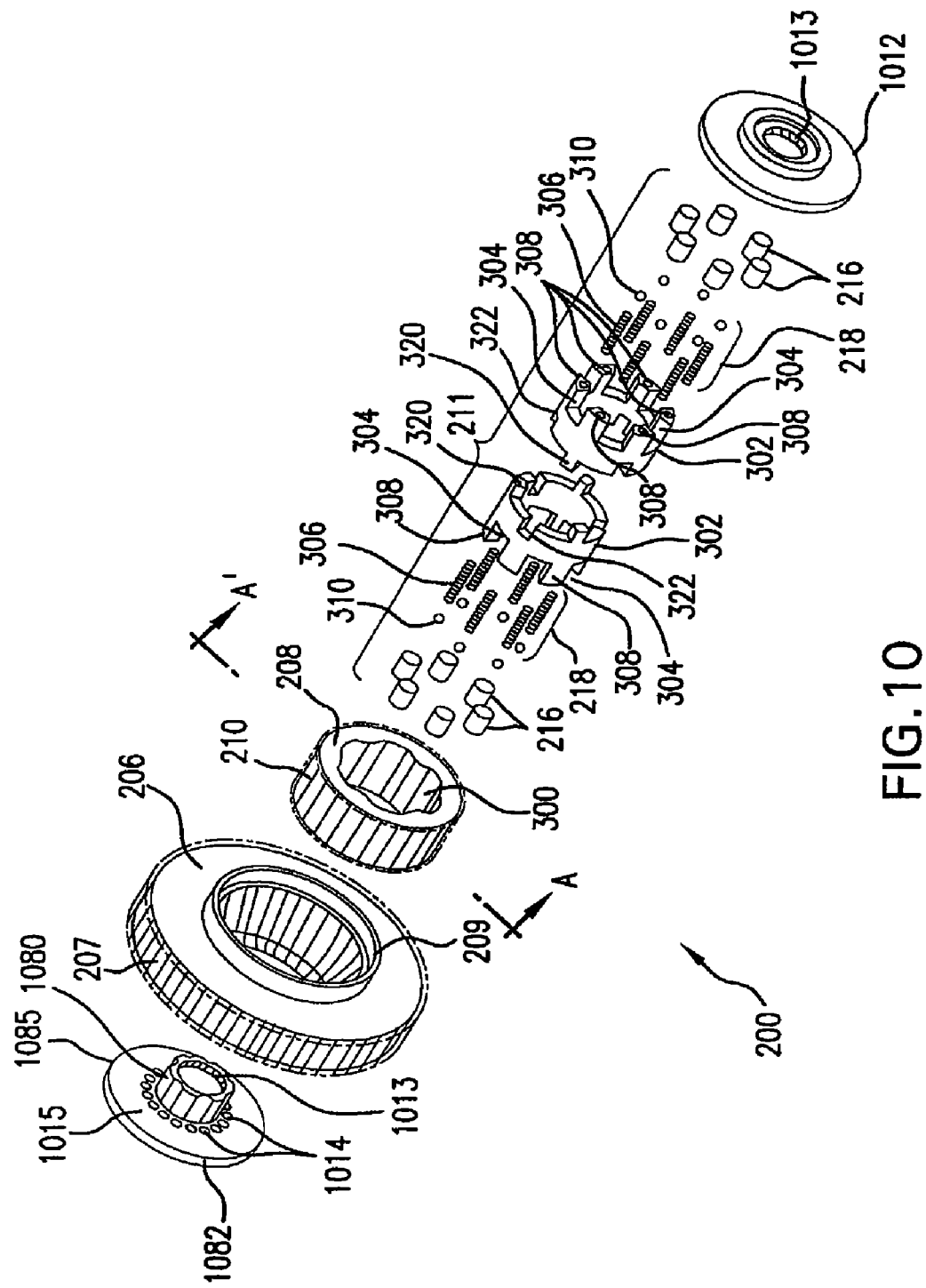
FIG. 10 is an exploded view of the bi-directional overrunning clutch of FIG. 2, in accordance with an alternative embodiment.
Figure 11A:
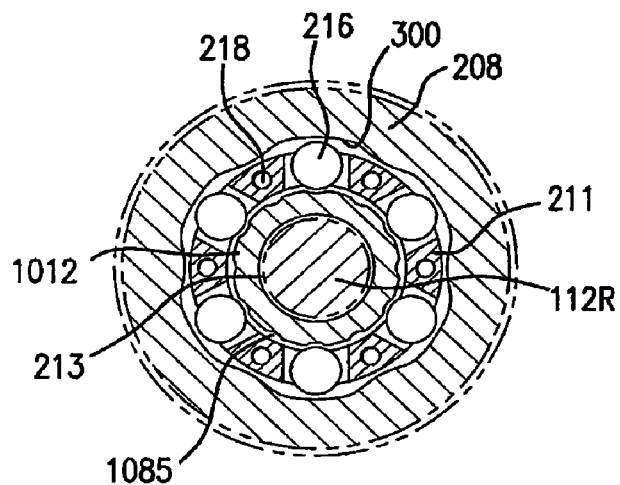
Figure 11B:
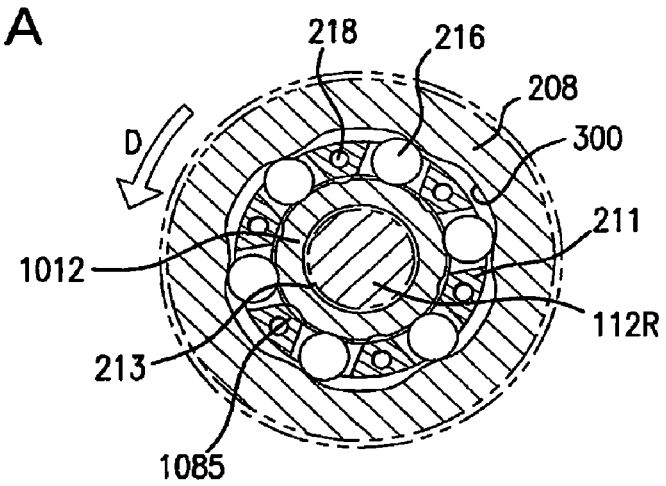
Figure 11C:
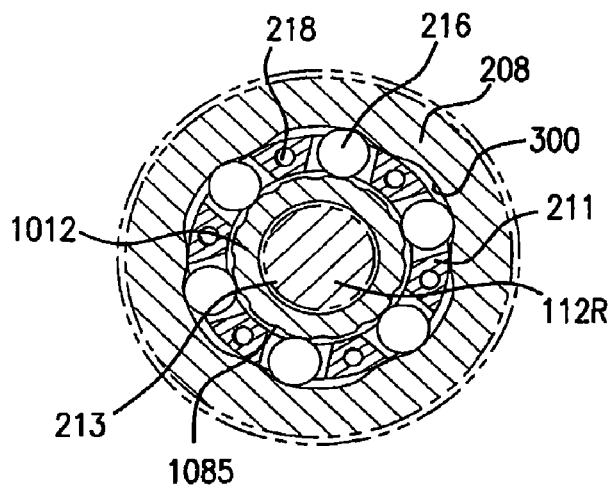

FIGS. 11A, 11B, and 11C are cross-sectional views taken along line A-A' of the bi-directional overrunning clutch of FIG. 10.

Figure 12:
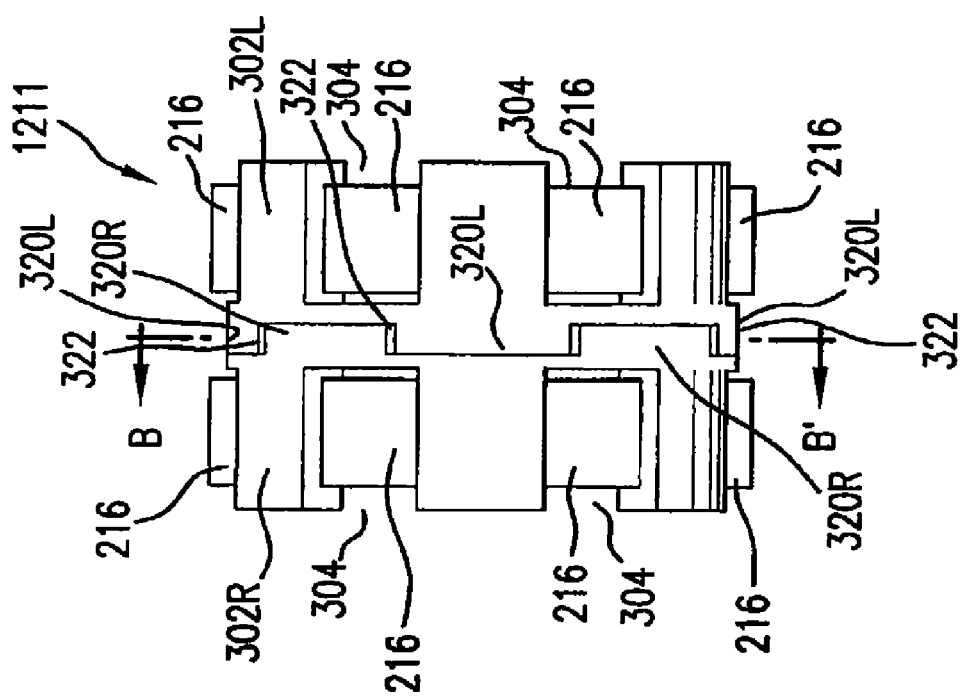

FIG. 12 is a plan view of a roller assembly of FIG. 10.

Figure 13:
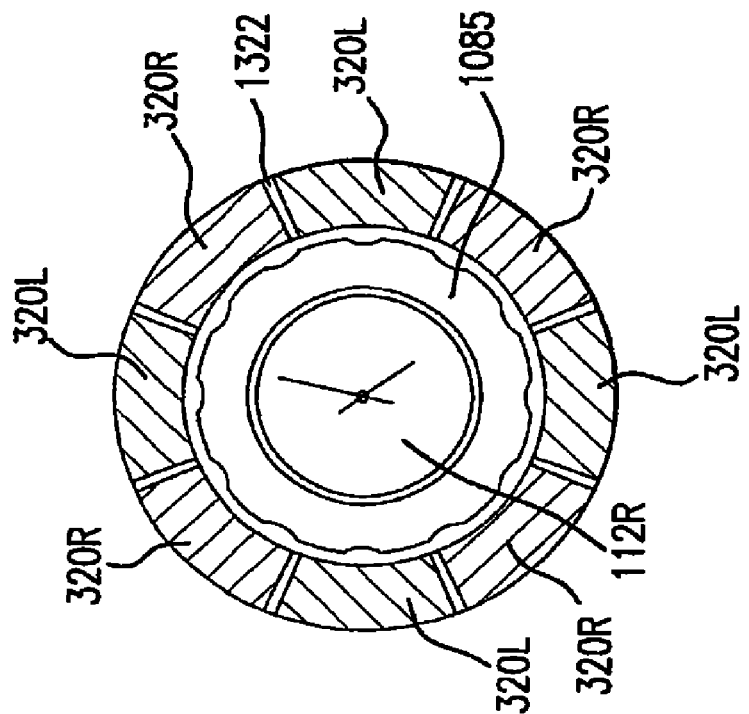

FIG. 13 is a cross-sectional view taken along line B-B' of the roller assembly of FIG. 12.

Figure 14:
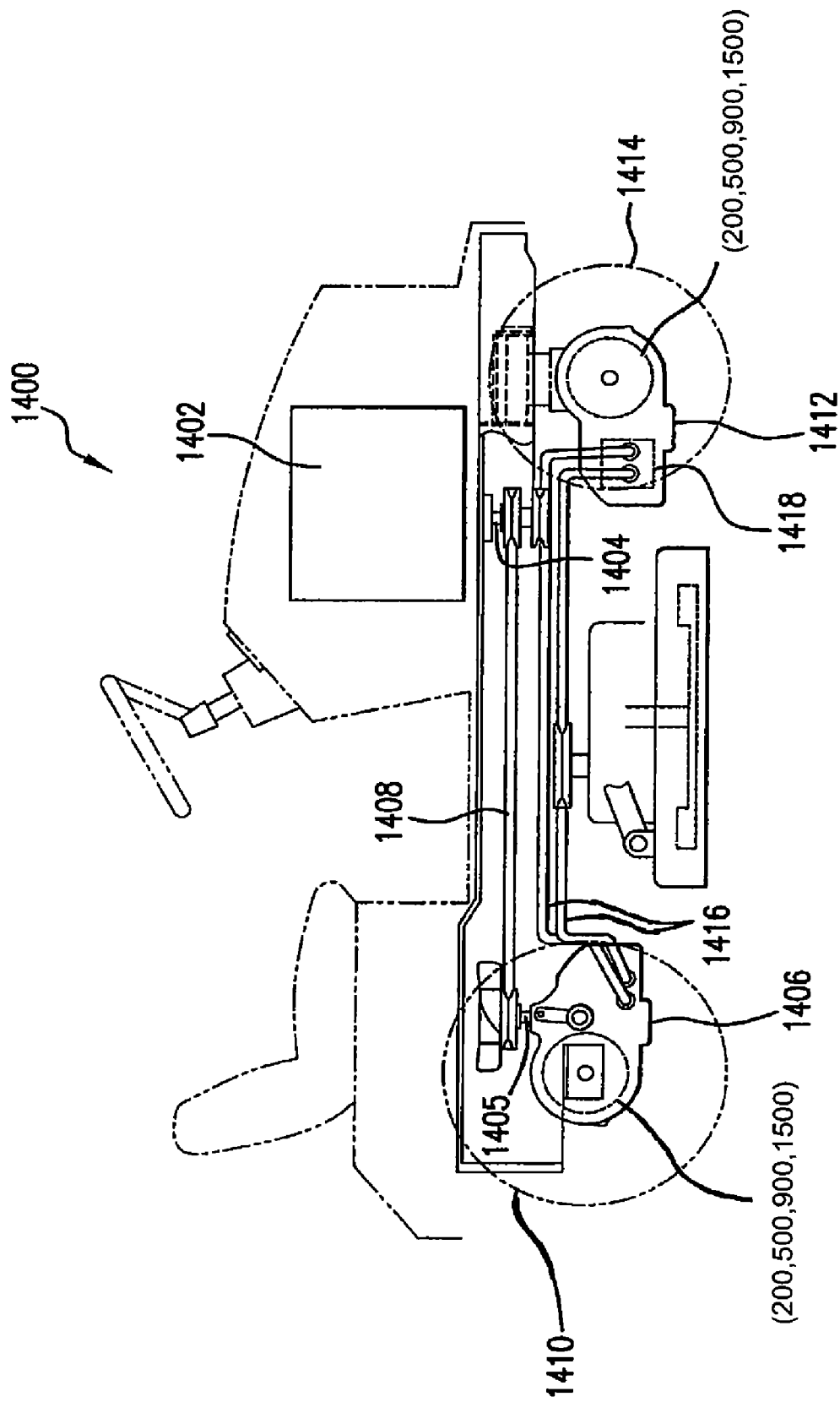

FIG. 14 is a side view of a working vehicle in accordance with an alternative embodiment presented herein.

Figure 15:
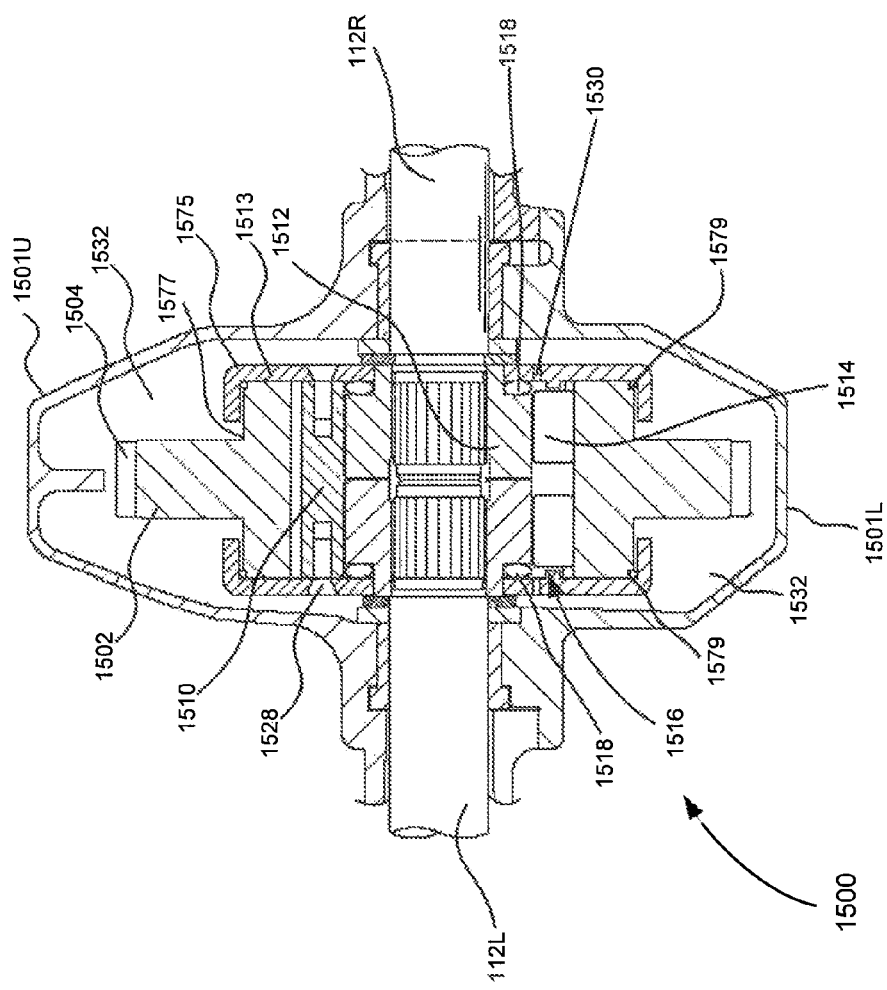

FIG. 15 is a sectional view of a bi-directional overrunning clutch in accordance with an alternative embodiment.

Figure 16:
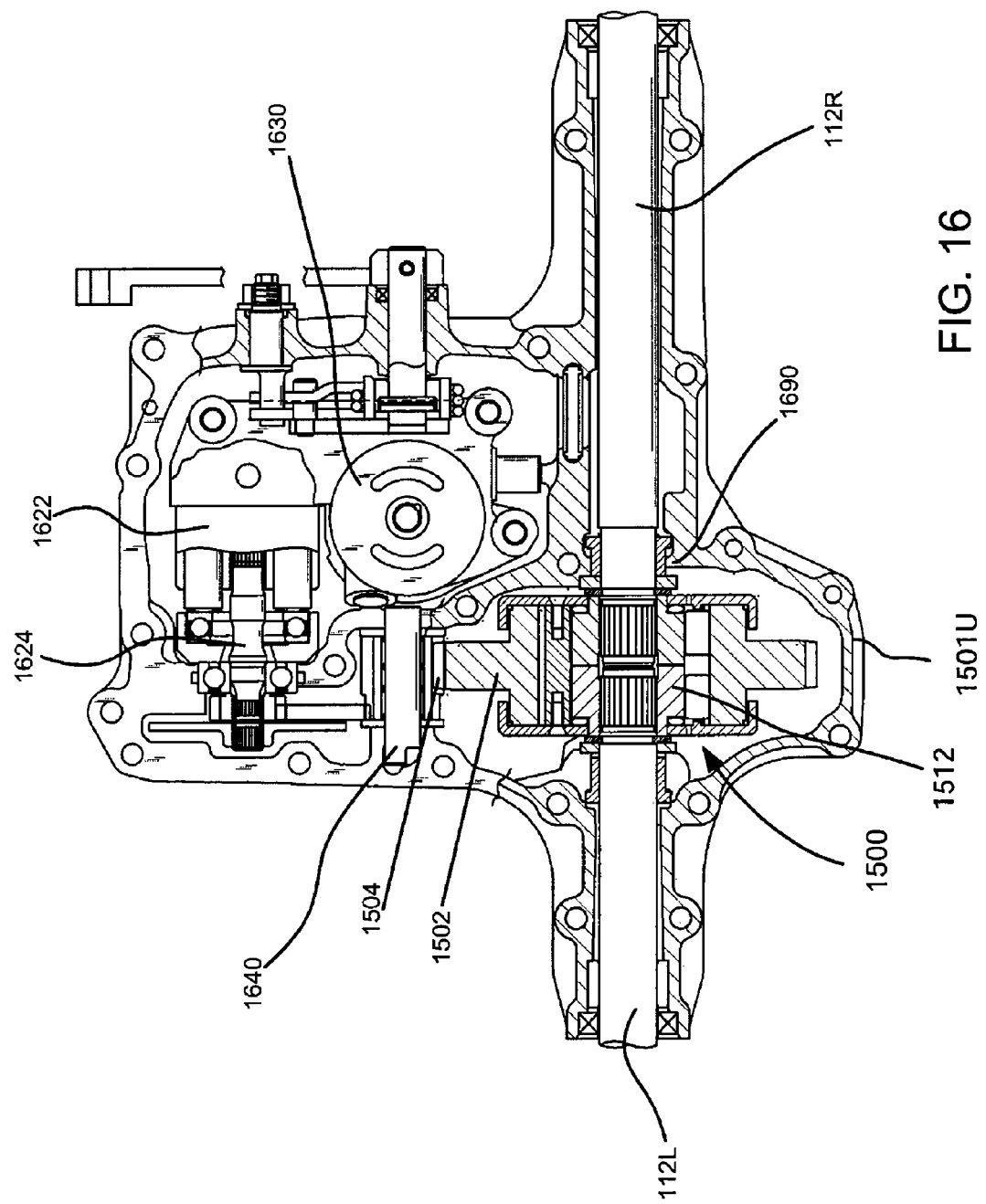

FIG. 16 is a sectional plan view of a transaxle incorporating the bi-directional overrunning clutch of FIG. 15.

DETAILED DESCRIPTION OF THE INVENTION

Embodiments of the present invention are herein described with reference to the figures, where like reference numbers indicate identical or functionally similar elements. Also in the figures, the left most digit of each reference number generally corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the appended claims. It will be apparent to a person skilled in the relevant art that the embodiments presented herein may also be employed in a variety of other applications.

The noun "transmission" is used herein to generally refer to the mechanical components that are used to transmit drive power from a prime mover to a drive axle. The term "transaxle" is intended to refer to the combination of components, which includes a transmission, a differential/clutch unit, and a drive axle, into one integrated assembly.

Figure 1:
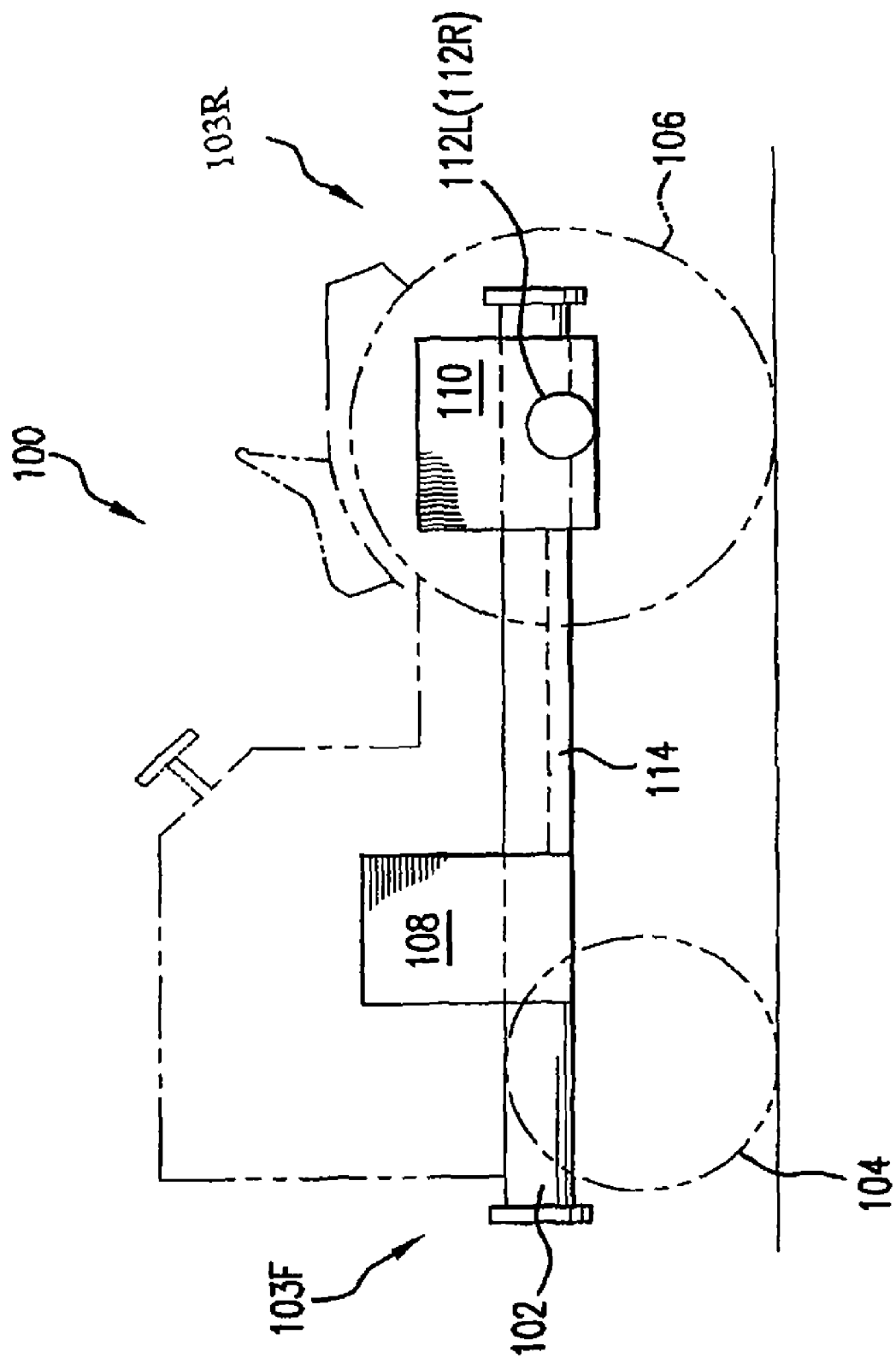
FIG. 1 is a side view of a working vehicle incorporating a bi-directional overrunning clutch.

FIG. 1 illustrates a working vehicle 100, such as a lawn or garden tractor. Working vehicle 100 includes a frame 102, which extends from front end 103F to rear end 103R of vehicle 100. A front pair of wheels 104 and a rear pair of wheels 106 are mounted on frame 102. Working vehicle 100 has an engine 108 mounted near the front end of frame 102. A person skilled in the art would understand that engine 108 can be mounted anywhere on frame 102 (front, middle, or rear). As shown, a transmission 110 is disposed at the rear of frame 102 of working vehicle 100. A drive train 114 transmits power from engine 108, and serves as an input shaft into transmission 110, ultimately transmitting rotary power to rear axle shaft segments 112L, 112R. Transmission 110 can be any type of transmission known to the art; for example, an integrated hydrostatic transmission (IHT) or a standard mechanical transmission. An exemplary IHT is described in U.S. Pat. No. 6,619,038, the disclosure of which is hereby incorporated by reference in its entirety. An exemplary mechanical transmission is described in U.S. Pat. No. 6,098,386, the disclosure of which is hereby incorporated by reference in its entirety. Further, transmission 110 may alternatively be mounted on the front of frame 102 if the vehicle is a front wheel drive vehicle.

Figure 2:
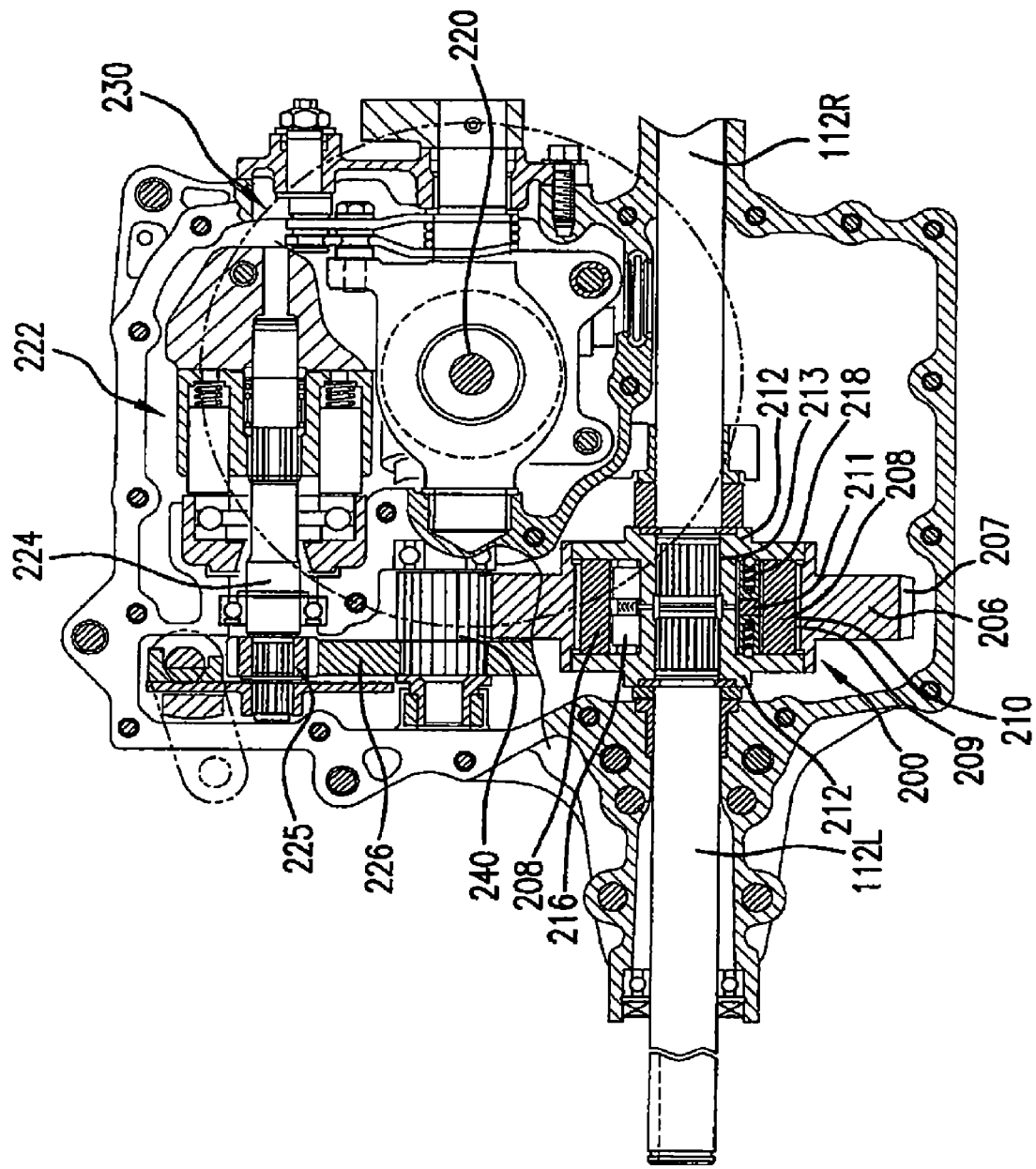
FIG. 2 is a plan sectional view of a transaxle in accordance with one embodiment presented herein.

FIG. 2 is a plan sectional view of a transaxle in accordance with one embodiment presented herein. FIG. 2 shows a bi-directional overrunning clutch 200 incorporated with an IHT. Bi-directional overrunning clutch 200 is disposed between left and right shaft segments 112L, 112R. Left and right rear wheels 106 are attached to left and right shaft segments 112L, 112R, respectively. In operation, rotation of bi-directional overrunning clutch 200 transmits rotary motion to left and right shaft segments 112L, 112R, and thus to left and right rear wheels 106.

Bi-directional overrunning clutch 200 includes an input gear 206. Input gear 206, has gear teeth 207 along its outer periphery. Gear teeth 207 are adapted to mate with an input pinion gear 240, such that rotation of input pinion gear 240 (as discussed below) transmits rotary motion to input gear 206. Input gear 206 can be formed of a single piece of cast metal, or any other suitable materials known in the art. Input gear 206 may alternatively be formed of more than one material.

Disposed within input gear 206, is a cam gear 208. Disposed along the inner portion of input gear 206 are gear teeth 209. Gear teeth 209 mate with gear teeth 210, disposed along the outer surface of cam gear 208, as more clearly shown in FIG. 3, such that rotation of input gear 206 transmits rotary motion to cam gear 208. In an alternative embodiment, input gear 206 and cam gear 208 may be formed of one integral piece.

Disposed within cam gear 208 is a roller assembly 211. Roller assembly 211 includes rollers 216 and spring pins 218. Roller assembly 211, rollers 216, and spring pins 218 will be discussed in more detail below with relation to FIG. 3. Disposed within roller assembly 211 are a pair of hubs 212. Hubs 212 are engaged with left and right shaft segments 112L, 112R, respectively, through splined engagements 213. Thus, rotation of hubs 212 transmits rotary motion to left and right shaft segments 112L, 112R.

As shown in FIG. 2, bi-directional overrunning clutch 200 is incorporated with an IHT. As such, rotary motion is transmitted from engine 108, through drive train 114, and into the IHT through IHT input shaft 220. IHT input shaft 220 transmits rotary motion to a hydraulic pump 230 (shown in phantom), which in turn is fluidly connected to hydraulic motor 222. Hydraulic motor 222, hydraulically driven by the hydraulic pump, rotates a hydraulic motor output shaft 224, which rotates a pair of pinion gears 225, 226, which ultimately rotate input pinion gear 240. As such, the pinion gears serve as an output drive train to transmit rotary power between the IHT and the bi-directional overrunning clutch 200. As discussed above, rotation of input pinion gear 240 rotates input gear 206 of bi-directional overrunning clutch 200 to ultimately provide drive power for left and right shaft segments 112L, 112R.

Figure 3:
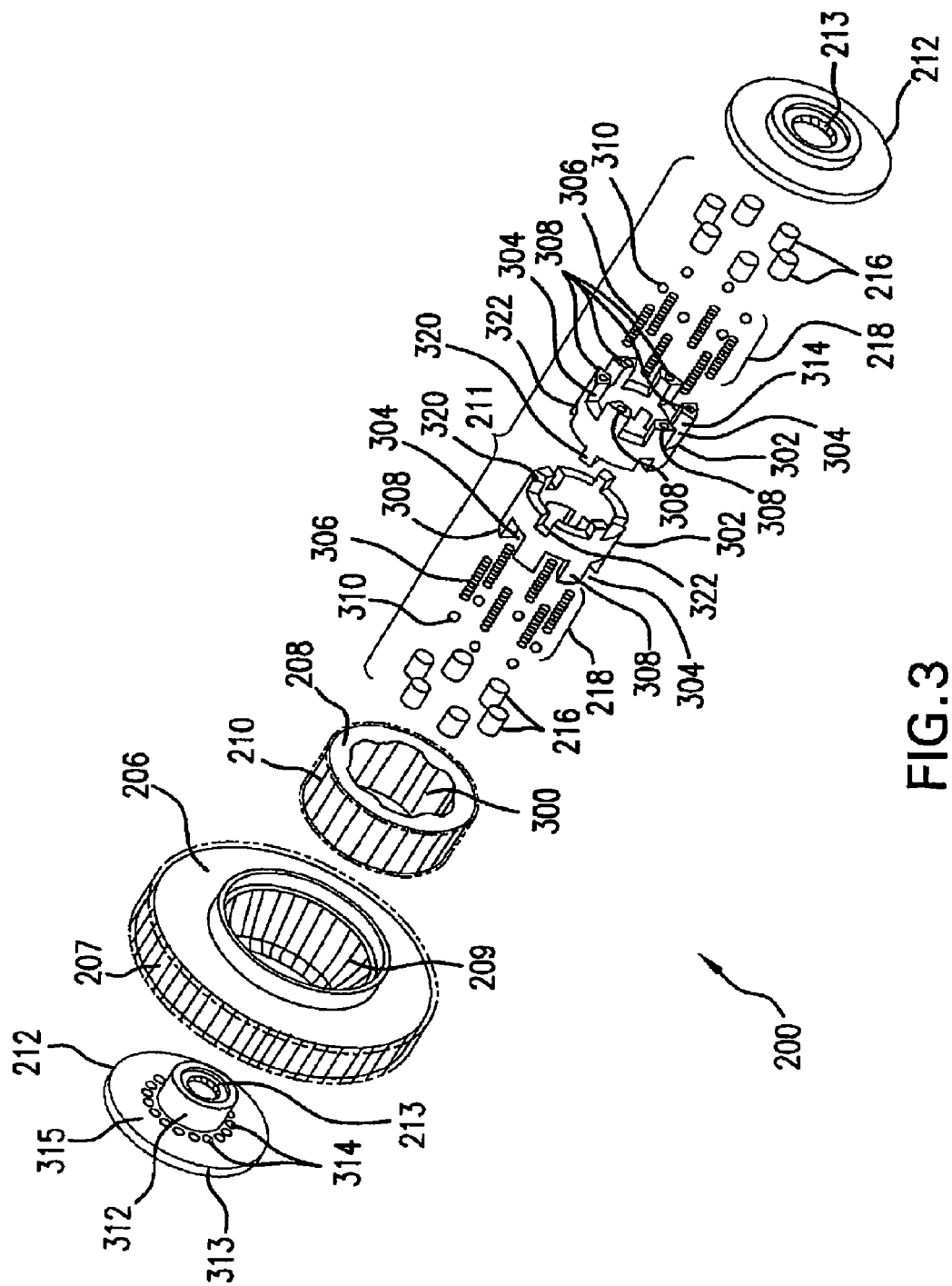
FIG. 3 is an exploded view of the bi-directional overrunning clutch of FIG. 2.

FIG. 3 shows an exploded view of bi-directional overrunning clutch 200. As shown, input gear 206 has gear teeth 207 around its outer periphery. Input gear 206 further includes gear teeth 209 along its inner portion. Gear teeth 209 are fitted to mate with gear teeth 210 on the outer surface of cam gear 208. Thus, rotation of input gear 206 transmits rotational motion to cam gear 208. In an alternative embodiment, input gear 206 and cam gear 208 may be formed of one integral piece. In other alternative embodiments, input gear 206 and/or cam gear 208 may be segmented into multiple pieces as may be deemed necessary by one of skill in the art.

Cam gear 208 includes an inner cam surface 300. Inner cam surface 300 is adapted to form a wedging engagement with roller assembly 211, when roller assembly 211 is disposed within cam gear 208. As such, rotation of input gear 206 rotates cam gear 208 and in turn locks roller assembly 211 into a wedging engagement with inner cam surface 300, and thus transmits rotary motion from input gear 206 to roller assembly 211.

Roller assembly 211 is comprised of a pair of roll cages 302 having a plurality of recesses 304. One of a plurality of rollers 216 is aligned and held within each recess 304. In operation, the interaction between rollers 216 and inner cam surface 300 produces the wedging engagement described above. Each roll cage 302 also includes a plurality of extensions 320 designed to fit within corresponding recesses 322 in the other roll cage 302. Preferably, extensions 320 loosely fit within recesses 322 to form a loose fitting interlock between the two roll cages 302; with, for example, three degrees of play between the two roll cages 302. In an alternative embodiment, the pair of roll cages 302 may be replaced with one integral roll cage.

Roller assembly 211 also includes a plurality of spring pins 218, which are comprised of a spring 306 and a ball lock member 310. As shown, a spring pin 218 is disposed within one, or more, of the openings 308 in the roll cages 302. In an alternative embodiment, spring pins 218 can be adhered to the surface of roll cage 302 and thereby adapted to extend in a direction coaxial with roller assembly 211. Alternatively, spring pins 218 can be adapted to transect through the entirety of roller assembly 211. Ball lock members 310 are adapted to engage with detents 314 along an inner surface 315 of each hub 212.

When properly assembled, hubs 212 are aligned coaxially with input gear 206 and are located within at least a portion of roller assembly 211. Each hub 212 is generally one integral unit having a base portion 312 and a cover portion 313. In an alternative embodiment, each hub 212 may be comprised of two individual pieces, for example a base and a cover, which are attached by conventional attachment means. When bi-directional overrunning clutch 200 is assembled, base portion 312 is in direct contact with rollers 216, and cover portion 313 covers at least the cam surface 300 of cam gear 208.

Each hub 212 includes a splined portion 213, which is adapted to engage with the ends of left and right shaft segments 112L, 112R. As such, rotation of each hub 212 transfers rotary motion to the respective shaft segment.

The inner surfaces 315 of cover portions 313 of hubs 212 include a plurality of detents 314. Each detent 314 is adapted to engage with a ball lock member 310 of a spring pin 218. In operation, the plurality of detents 314 form a plurality of spring pin engagements with ball lock members 310 of spring pins 218. Thus, rotation of roller assembly 211 rotates hubs 212 through the engagement of spring pins 218. As such, ball lock members 310 serve as friction members creating friction between the roller assembly 211 and the hubs 212. Spring pins 218, however, are adapted to disengage the spring pin engagements if one hub 212 rotates faster than roller assembly 211, or rotates faster than the opposite hub 212.

Figure 4B:
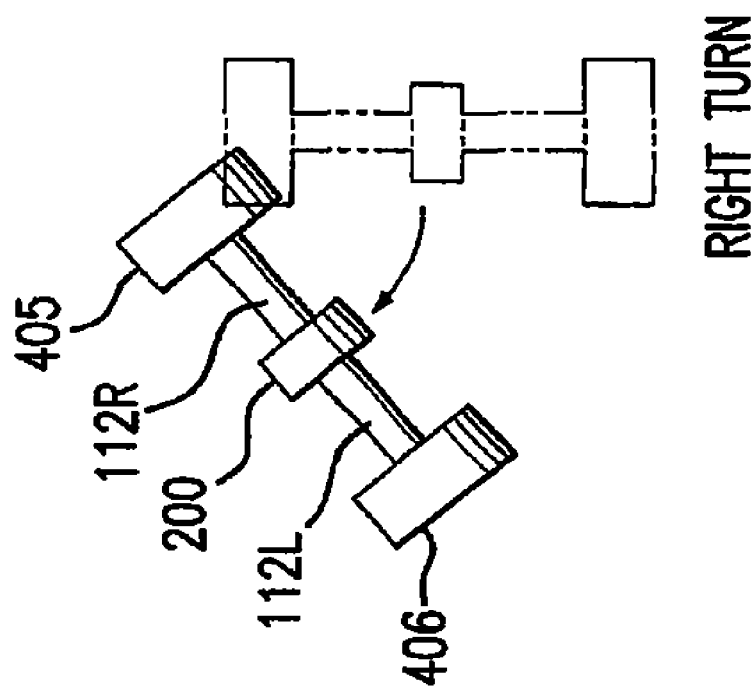
FIG. 4B is a schematic view of a drive axle making a right turn.
Figure 4A:
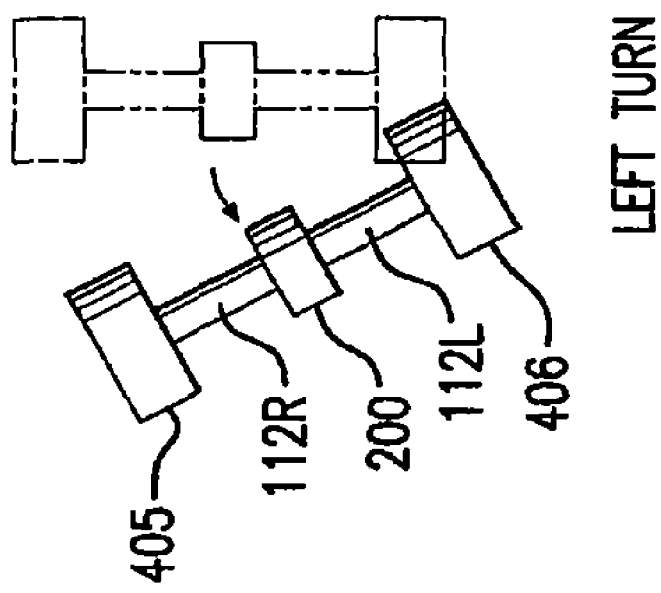
FIG. 4A is a schematic view of a drive axle making a left turn.

For example, when working vehicle 100 is making a left turn, as shown in FIG. 4A, right wheel 405 is forced to turn faster than left wheel 406 because right wheel 405 must cover a greater distance than left wheel 406 in the same amount of time. As such, the quicker rotation of right wheel 405 will result in quicker rotation of right hub 212, than of left hub 212. Spring pins 218, engaged with right hub 212, will disengage with right hub 212, to thereby allow right hub 212 to rotate freely relative to left hub 212. Torque, however, is still transmitted through bi-directional overrunning clutch 200 to left wheel 406 through the spring pin engagements with left hub 212.

When working vehicle 100 is making a right turn, as shown in FIG. 4B, left wheel 406 is forced to turn faster than right wheel 405 because left wheel 406 must cover a greater distance than right wheel 405 in the same amount of time. As such, the quicker rotation of left wheel 406 will result in quicker rotation of left hub 212, than of right hub 212. The spring pins 218, engaged with left hub 212, will disengage with left hub 212, to thereby allow left hub 212 to rotate freely relative to right hub 212. Torque, however, is still transmitted through bi-directional overrunning clutch 200 to right wheel 405 through the spring pin engagements with right hub 212.

Figure 5:
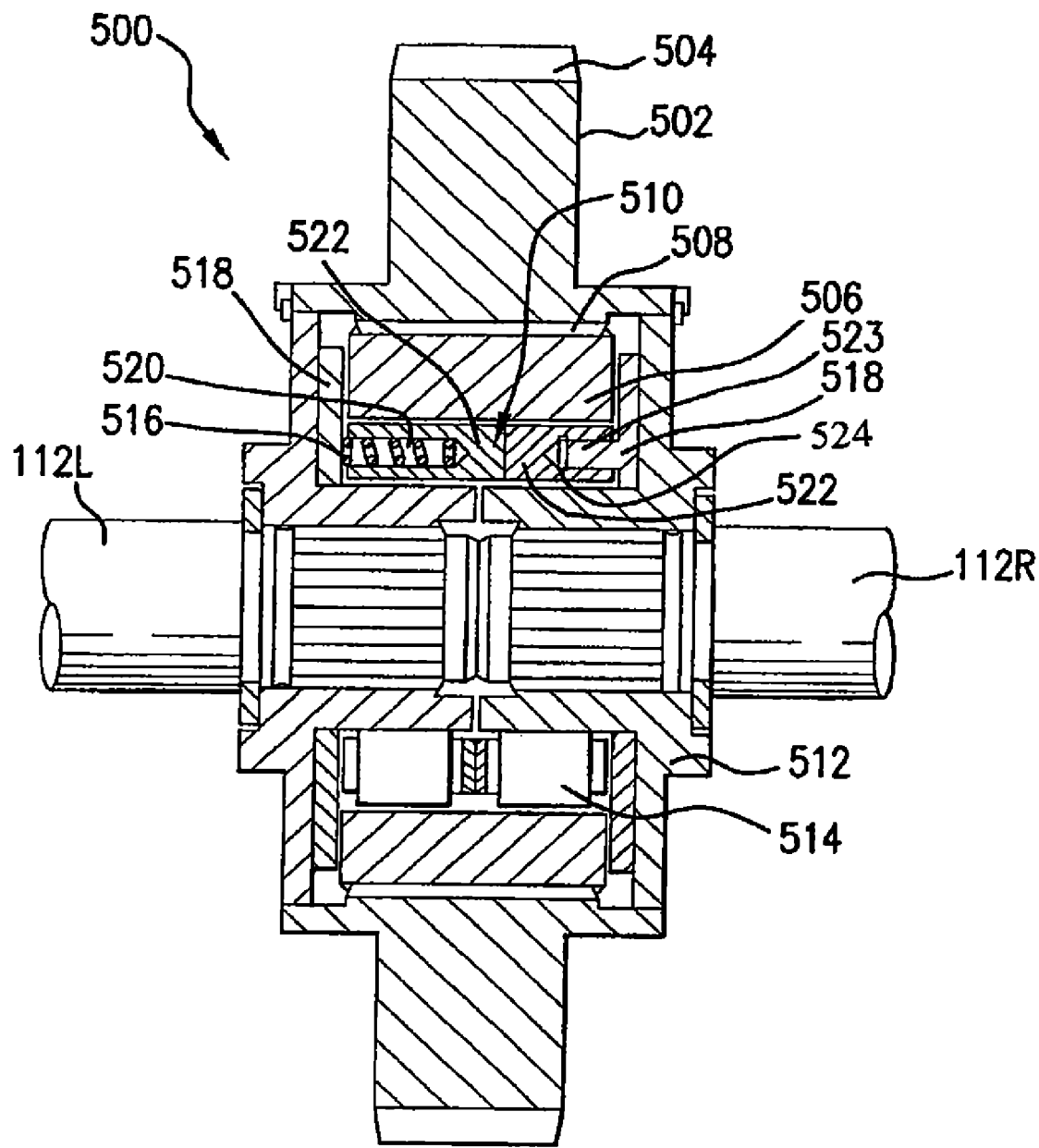
FIG. 5 is a sectional view of a bi-directional overrunning clutch in accordance with one embodiment presented herein.

FIG. 5 is a sectional view of a bi-directional overrunning clutch 500 in accordance with an alternative embodiment. Similar to bi-directional overrunning clutch 200, clutch 500 includes an input gear 502, having gear teeth 504 along its periphery, a cam gear 506, disposed within input gear 502 and mated through gear teeth engagement 508, and a roller assembly 510. In an alternative embodiment, input gear 502 and cam gear 506 may be formed of one integral piece. In other alternative embodiments, input gear 502 and/or cam gear 506 may be segmented into multiple pieces as may be deemed necessary by one of skill in the art. Additionally, hubs 512 are disposed within roller assembly 510 and mated with left and right shaft segments 112L, 112R. Rollers 514 are included to form a wedging engagement between roller assembly 510 and cam gear 506.

Roller assembly 510 differs from roller assembly 211 in that roller assembly 510 includes springs 516 and friction members 518. Springs 516 are located within recesses 520 in roll cage 522. Friction members 518 include protrusions 523, which extend into recesses 524 in roll cage 522. Each roll cage 522 includes a plurality of alternating recesses 520 and 524, along the circumference of roll cage 522, for receiving springs 516 and friction member protrusions 523, respectively.

In operation, springs 516 push against friction members 518, which in turn pushes against hub 512. The spring force of spring 516 also exerts a force in the opposite direction, thus pushing roll cage 522 against the opposite friction member 518 and hub 512. As such, rotation of the roller assembly 510 will transmit rotary motion to hubs 512 through the frictional forces between the friction members 518 on either side of roll cages 522. However, when one shaft segment must rotate faster than the roller assembly 510, or faster than the opposite shaft segment, as described above, the frictional force between the hubs 512 and the friction members 518 will be overcome, and one hub 512 will be allowed to freely rotate faster than the roller assembly 510.

Figure 6:
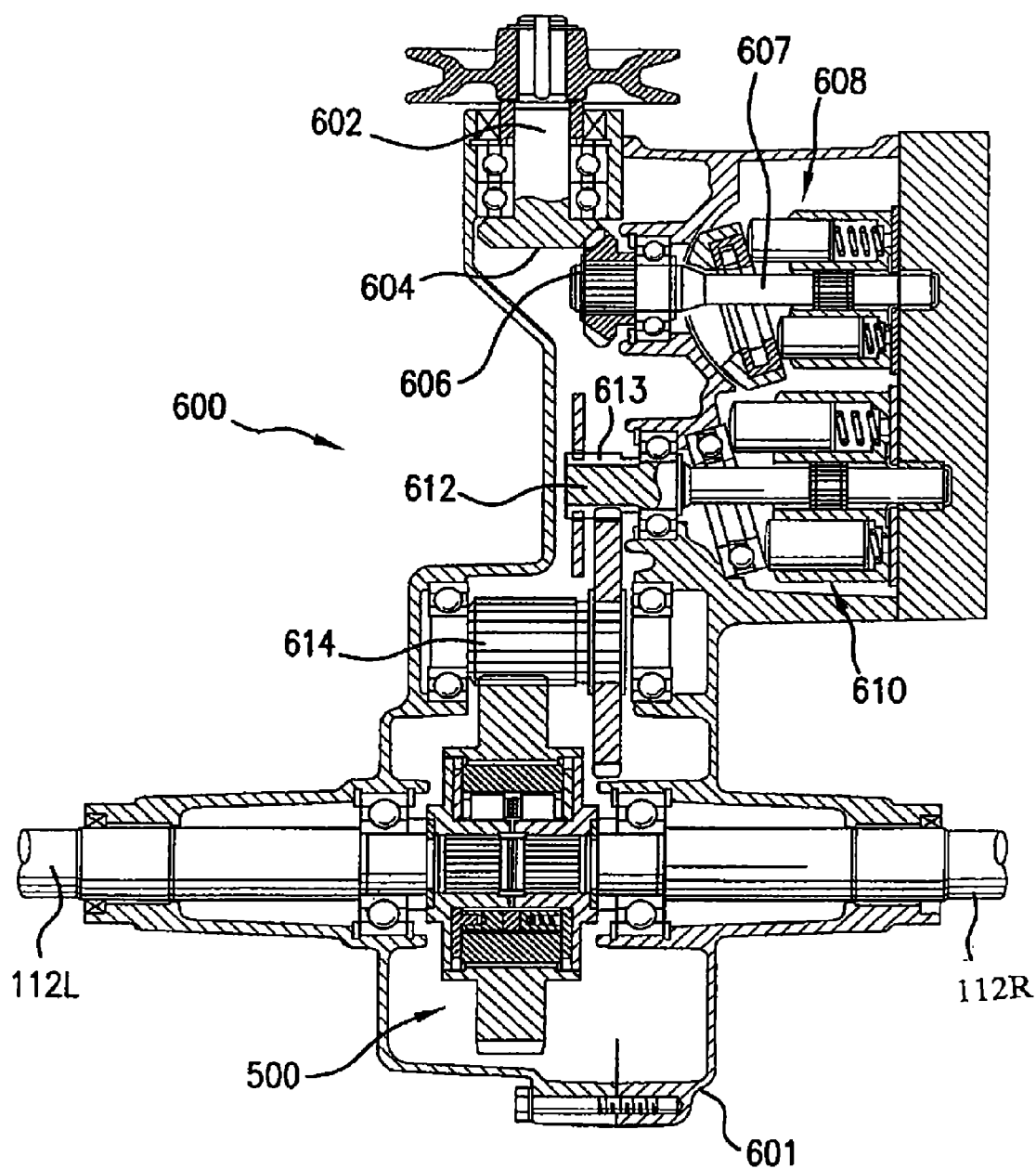
FIG. 6 is a sectional view of a transaxle in accordance with one embodiment presented herein.

FIG. 6 is a sectional view of a transaxle in accordance with one embodiment presented herein. IHT 600 is housed by a vertically-split case 601. IHT input shaft 602 receives rotary motion from engine 108. Through bevel gears 604 and 606, serving as an input drive train, rotary motion is transmitted to the pump input shaft 607 of hydraulic pump 608. Hydraulic pump 608 is in fluid communication with hydraulic motor 610, to thereby drive hydraulic motor 610. Hydraulic motor 610 then rotates hydraulic motor output shaft 612, which rotates gears 613, ultimately rotating input pinion 614. As described above, rotations of input pinion transmits rotary motion to bi-directional overrunning clutch 500, which ultimately drives rotation of left and right shaft segments 112L, 112R. Further, the transaxle configuration shown in FIG. 6 incorporates bi-directional overrunning clutch 500 for exemplary purposes only. Therefore, any of the bi-directional overrunning clutch embodiments (200, 500, 900, and 1500) described herein may alternatively be incorporated into the transaxle shown in FIG. 6.

Figure 7:
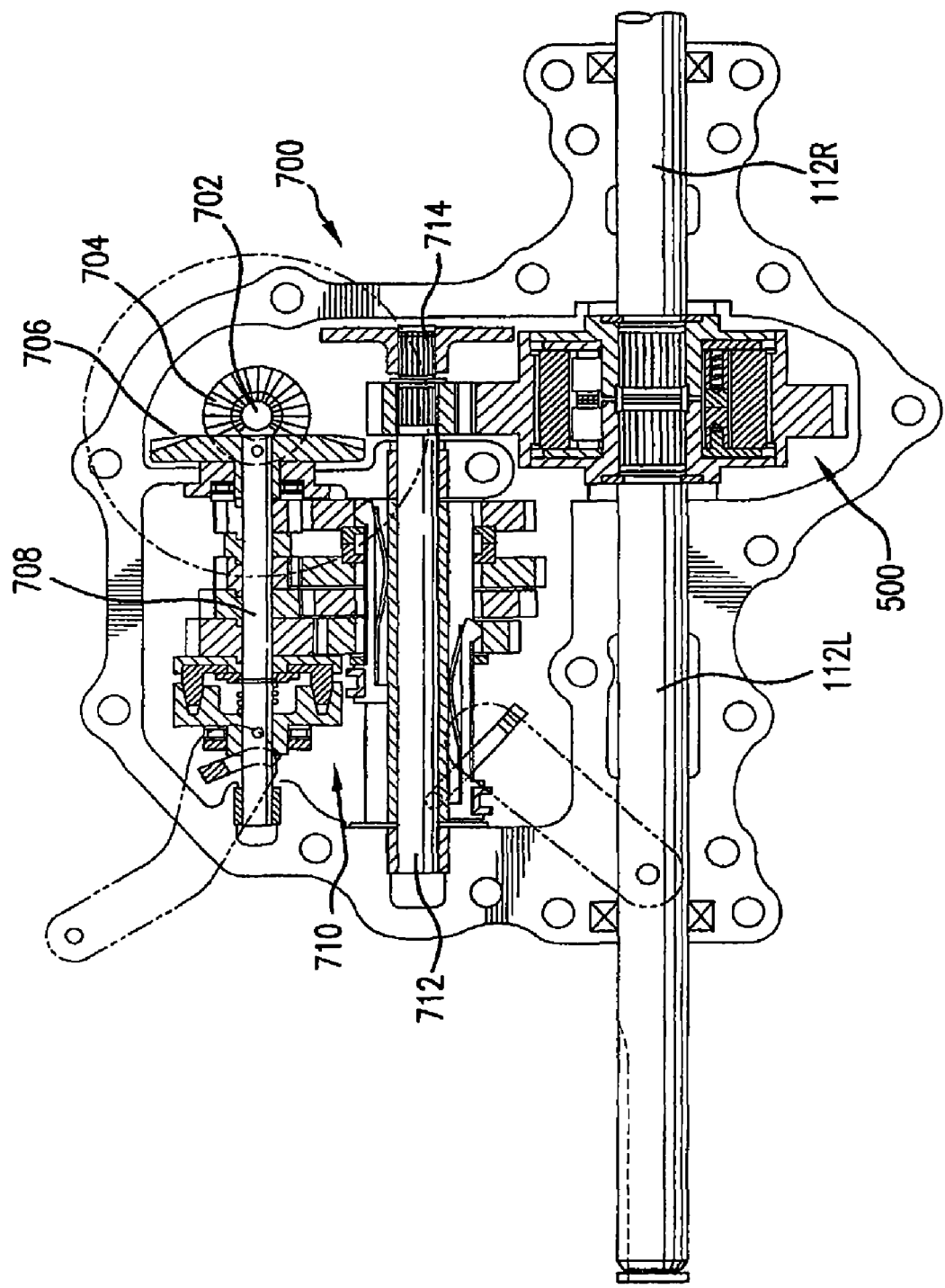
FIG. 7 is a plan sectional view of a transaxle in accordance with another embodiment presented herein.

FIG. 7 is a plan sectional view of a transaxle in accordance with another embodiment presented herein. FIG. 7 shows bi-directional overrunning clutch 500 incorporated with a mechanical transmission 700. Mechanical transmission 700 is driven by input shaft 702, which in turn is driven by engine 108. Input shaft 702 turns bevel gear 704, which rotates sun gear 706. Rotation of sun gear 706 causes rotation of an intermediate shaft 708. Through the clutch arrangement 710, an output shaft 712 is driven. Clutch arrangement 710 is described in more detail in U.S. Pat. No. 6,098,386. Output shaft 712 rotates input pinion 714, which transmits rotary motion to bi-directional overrunning clutch 500, ultimately driving left and right shaft segments 112L, 112R. Further, the transaxle configuration shown in FIG. 7 incorporates bi-directional overrunning clutch 500 for exemplary purposes only. Therefore, any of the bi-directional overrunning clutch embodiments (200, 500, 900, and 1500) described herein may alternatively be incorporated into the transaxle shown in FIG. 7.

Figure 8:
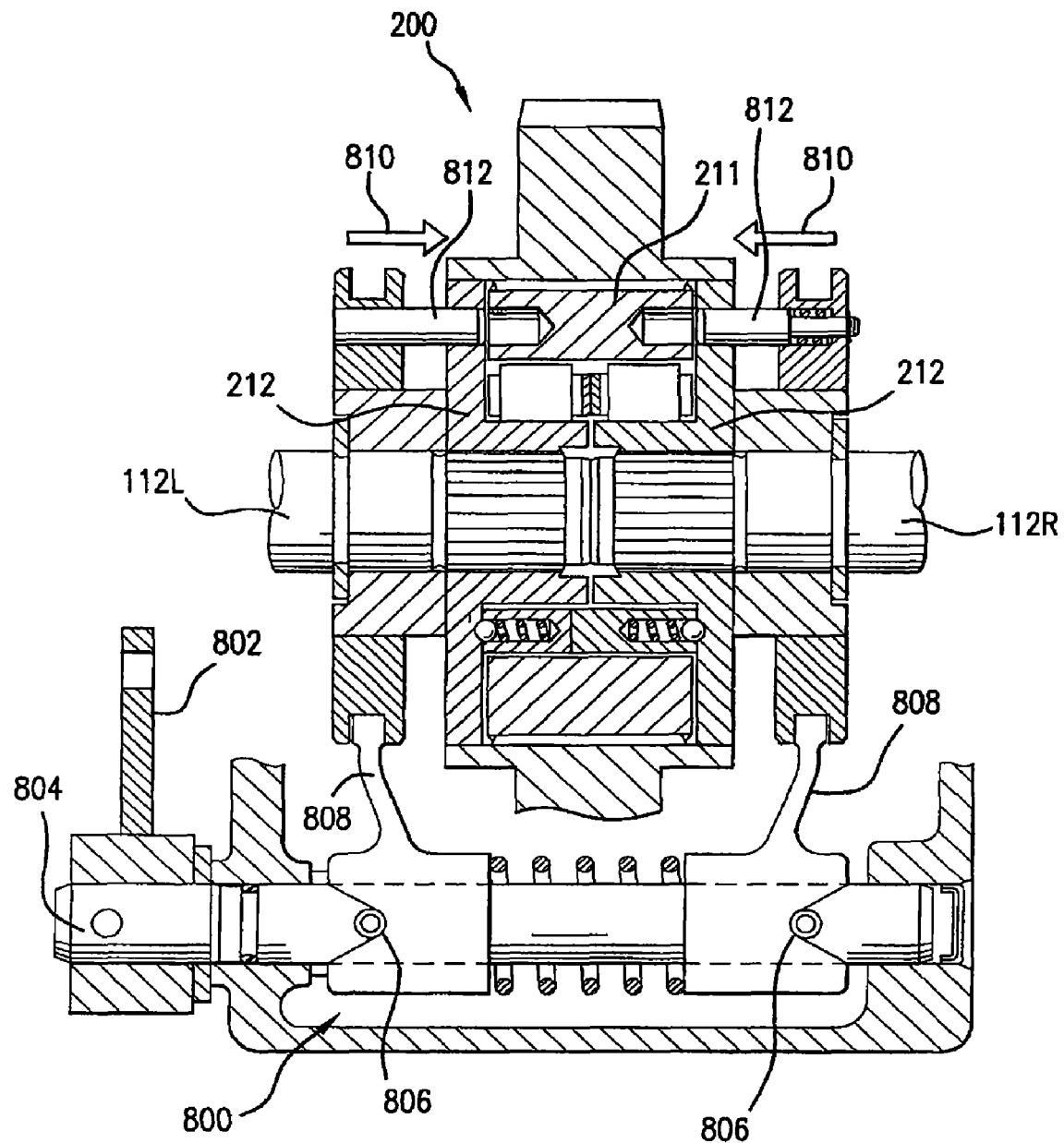
FIG. 8 is a sectional view of the bi-directional overrunning clutch of FIG. 5, incorporating a differential lock mechanism.

FIG. 8 is a sectional view of bi-directional overrunning clutch 200, incorporating a differential lock mechanism 800. As shown, a differential lock lever 802 may be utilized to rotate cam shaft 804. Cam shaft 804 has a pair of cam engagements 806 with forks 808. Rotation of cam shaft 804 causes thrust forces 810 which push lock members 812 into the roller assembly 211. When lock members 812 are locked into roller assembly 211, the hubs 212 are interlocked with roller assembly 211, and differential rotation between left and right shaft segments 112L, 112R is not permitted.

Figure 9:
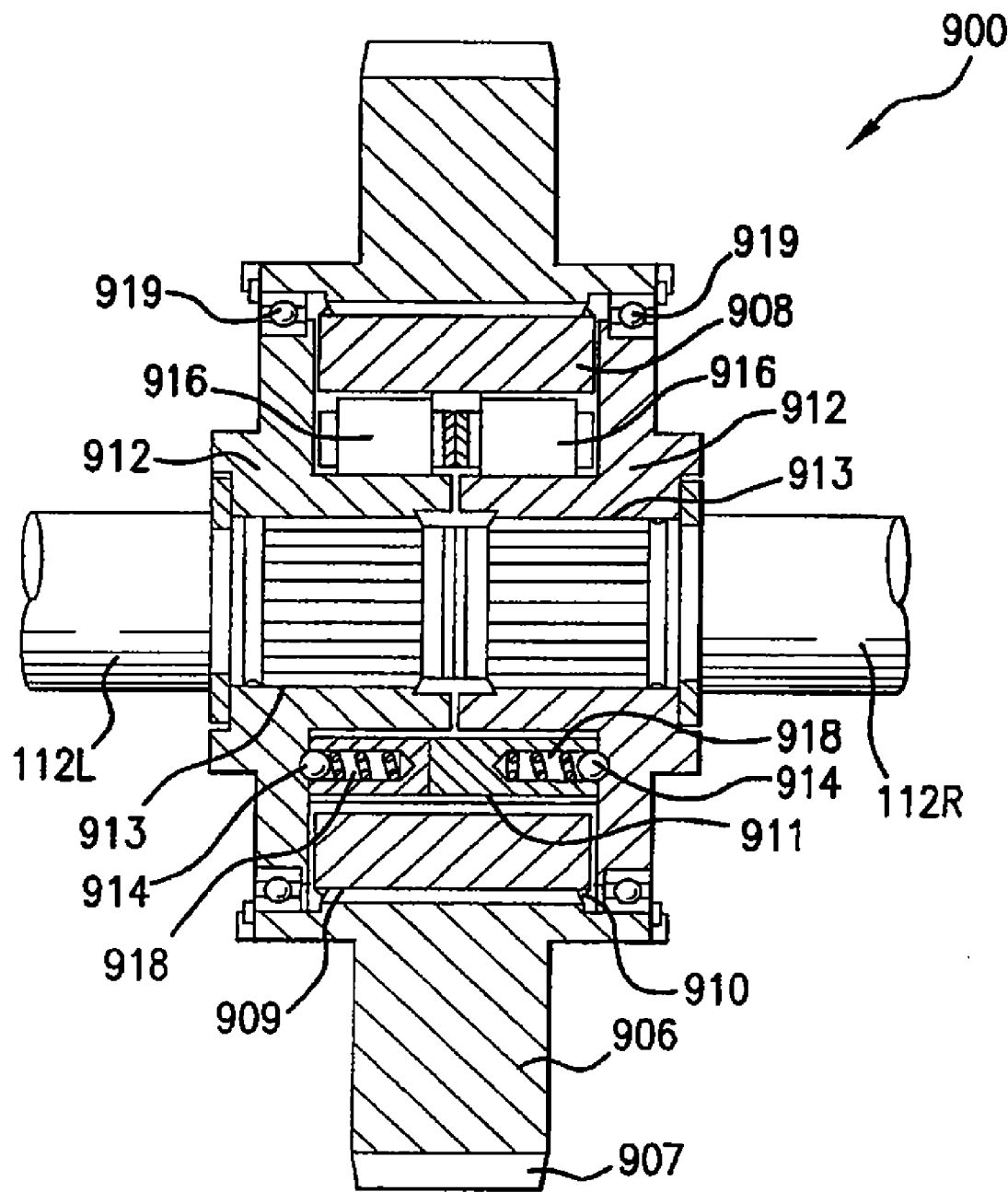
FIG. 9 is a sectional view of an alternative bi-directional overrunning clutch.

FIG. 9 is a sectional view of a bi-directional overrunning clutch 900, in accordance with an alternative embodiment of the present invention. Bi-directional overrunning clutch 900 is disposed between left and right shaft segments 112L, 112R. Left and right rear wheels 106 are attached to left and right shaft segments 112L, 112R, respectively. In operation, rotation of bi-directional overrunning clutch 900 transmits rotary motion to left and right shaft segments 112L, 112R, and thus to left and right rear wheels 106, in similar fashion as described with respect to bi-directional overrunning clutch 200 in FIG. 2.

Bi-directional overrunning clutch 900 includes an input gear 906. Input gear 906, has gear teeth 907 along its outer periphery. Gear teeth 907 are adapted to mate with an input pinion gear, such that rotation of input pinion gear transmits rotary motion to input gear 906. Input gear 906 can be formed of a single piece of cast metal, or any other suitable materials known in the art. Input gear 906 may alternatively be formed of a combination of two or more pieces of material.

Disposed within input gear 906, is a cam gear 908. Disposed along the inner portion of input gear 906 are gear teeth 909. Gear teeth 909 mate with gear teeth 910, disposed along the outer surface of cam gear 908 such that rotation of input gear 906 transmits rotary motion to cam gear 908. In an alternative embodiment, input gear 906 and cam gear 908 may be formed of one integral piece. In other alternative embodiments, input gear 906 and/or cam gear 908 may be segmented into multiple pieces as may be deemed necessary by one of skill in the art.

Disposed within cam gear 908 is a roller assembly 911. Roller assembly 911 includes rollers 916 and spring pins 918. Disposed within roller assembly 911 are a pair of hubs 912. Spring pins 918 form spring pin engagements with detents 914 on the inner surface of hubs 912. Further, hubs 912 are engaged with left and right shaft segments 112L, 112R, respectively, through splined engagements 913. Thus, rotation of hubs 912 transmits rotary motion to left and right shaft segments 112L, 112R.

Bi-directional overrunning clutch 900 includes ball bearings 919 disposed between hubs 912 and input gear 906. Ball bearings 919 serve to properly align and hold the uniform distribution of the components of bi-directional overrunning clutch 900. Ball bearings 919 also serve to maintain roller assembly 911 centered within input gear 906. While ball bearings are specifically shown in FIG. 9, one of skill in the art would know that alternative bearings, such as bush bearings, may be used.

FIG. 10 is an exploded view of bi-directional overrunning clutch 200 of FIG. 2, in accordance with an alternative embodiment. The depiction of bi-directional overrunning clutch 200 is similar to that of FIG. 3, with the exception of alternative hubs 1012. It should be noted that while alternative hubs 1012 are shown with respect to clutch 200, such hubs 1012 may be used in any of bi-directional overrunning clutch embodiments 200, 500, 900, and 1500 described herein.

As shown, input gear 206 has gear teeth 207 around its outer periphery. Input gear 206 further includes gear teeth 209 along its inner portion. Gear teeth 209 are fitted to mate with gear teeth 210 on the outer surface of cam gear 208. Thus, rotation of input gear 206 transmits rotational motion to cam gear 208. In an alternative embodiment, input gear 206 and cam gear 208 may be formed of one integral piece. In other alternative embodiments, input gear 206 and/or cam gear 208 may be segmented into multiple pieces as may be deemed necessary by one of skill in the art.

Cam gear 208 includes an inner cam surface 300. Inner cam surface 300 is adapted to form a wedging engagement with roller assembly 211, when roller assembly 211 is disposed within cam gear 208. As such, rotation of input gear 206 rotates cam gear 208 and in turn locks roller assembly 211 into a wedging engagement with inner cam surface 300, and thus transmits rotary motion from input gear 206 to roller assembly 211.

Roller assembly 211 is comprised of a pair of roll cages 302 having a plurality of recesses 304. One of a plurality of rollers 216 is aligned and held within each recess 304. In operation, the interaction between rollers 216 and inner cam surface 300 produces the wedging engagement described above. Each roll cage 302 also includes a plurality of extensions 320 designed to fit within corresponding recesses 322 in the other roll cage 302. Preferably, extensions 320 loosely fit within recesses 322 to form a loose fitting interlock between the two roll cages 302; with, for example, about three degrees of play between the two roll cages 302.

Roller assembly 211 also includes a plurality of spring pins 218, which are comprised of a spring 306 and a ball lock member 310. As shown, a spring pin 218 is disposed within one, or more, of the openings 308 in the roll cages 302. In an alternative embodiment, spring pins 218 can be adhered to the surface of roll cage 302 and thereby extend in a direction coaxial with roller assembly 211. Alternatively, spring pins 218 can transect through the entirety of roller assembly 211. Ball lock members 310 engage with detents 1014 along an inner surface 1015 of each hub 1012.

When properly assembled, hubs 1012 are aligned coaxially with input gear 206 and are located within at least a portion of roller assembly 211. Each hub 1012 is generally one integral unit having a base portion 1080 and a cover portion 1082. In an alternative embodiment, each hub 1012 may be comprised of two individual pieces, for example a base and a cover, which are attached by conventional attachment means.

When bi-directional overrunning clutch 200 is assembled, base portion 1080 is in direct contact with rollers 216, and cover portion 1082 covers at least the cam surface 300 of cam gear 208. The outer surface of base portion 1080 includes detents 1085. Detents 1085 serve to engage rollers 216 when clutch 200 is in rotation. As such, detents 1085 are positive locking elements which help transmit torque from roller assembly 211 to hub 1012.

The inner surfaces 1015 of cover portions 1082 of hubs 1012 include a plurality of detents 1014. Each detent 1014 engages with a ball lock member 310 of a spring pin 218. In operation, the plurality of detents 1014 form a plurality of spring pin engagements with ball lock members 310 of spring pins 218. Such spring pin engagements serve to properly align and hold the roller assembly such that rollers 216 engage with detents 1085. Spring pins 218, however, disengage the spring pin engagements if one hub 212 rotates faster than roller assembly 211, or rotates faster than the opposite hub 212.

Each hub 1012 also includes a splined portion 213, which engages with the ends of left and right shaft segments 112L, 112R. As such, rotation of each hub 1012 transfers rotary motion to the respective shaft segment.

FIGS. 11A, 11B, and 11C are cross-sectional views taken along line A-A' of the assembled bi-directional overrunning clutch of FIG. 10. FIGS. 11A, 11B, and 11C show cam gear 208, roller assembly 211, hub 1012, and shaft segment 112R. Roller assembly 211 includes rollers 216 and spring pins 218. Hub 1012 is engaged with right shaft segment 112R through splined engagement 213. Thus, rotation of hub 1012 transmits rotary motion to right shaft segment 112R. The left side of bi-directional overrunning clutch 200 is a mirror image of the right side.

Hub 1012 includes detents 1085, which serve to engage with rollers 216 under operative conditions. For example, FIG. 11A shows bi-directional overrunning clutch 200 in a neutral disengaged position. As such, rollers 216 are engaged with detents 1085, but not engaged with cam surface 300 of cam gear 208. When input gear is rotated in direction D, torque is transmitted to cam gear 208 through the splined engagement formed between teeth 209 and 210. FIG. 11B shows an engaged position. In FIG. 11B, cam gear 208 is turned in direction D, which in turn forces engagement between rollers 216 and cam surface 300. When rollers 216 are engaged with cam surface 300, torque is transmitted from the cam gear 208 to hub 1012 through the engagements between rollers 216 and detents 1085. As such, torque is transmitted to shaft segment 112R.

In the case in which the vehicle is turning, hub 1012 overruns the roller assembly 211 and disengages rollers 216 from detents 1085. This disengagement allows one shaft segment to rotate faster than the clutch 200. Such overrunning condition is shown in FIG. 11C. When the two shaft segments 112R, 112L return to normal conditions, the clutch 200 returns to the engaged position shown in FIG. 11B.

For optimal operation, there should be a loose fitting engagement between the two roll cages 302 of the roller assembly. Such a degree of play is illustrated in FIG. 12, which is a plan view of roller assembly 1211. Roller assembly 1211 is similar to roller assembly 211. Each roll cage 302R, 302L includes a plurality of recesses 304. One of a plurality of rollers 216 is aligned and held within each recess 304. Each roll cage 302R, 302L also includes a plurality of extensions 320R, 320L designed to fit within corresponding recesses 322 in the opposite facing roll cage. Preferably, extensions 320R, 320L loosely fit within recesses 322 to form a loose fitting interlock between the two roll cages 302R, 302L; with, for example, about three degrees of play between the two roll cages. In an alternative embodiment, the pair of roll cages may have up to thirty six degrees of play.

FIG. 13 is a cross-sectional view taken along line B-B' of the roller assembly of FIG. 12. FIG. 13 shows how alternating extensions 320R, 320L of roll cages 302R, 302L form a loosely fitting engagement. The space 1322 between the extensions 320R, 320L allow for the degree of play between the roll cages 302R, 302L.

FIG. 14 is a side view of a working vehicle 1400, such as a mower tractor, in accordance with an alternative embodiment of the present invention. Working vehicle 1400 includes a four-wheel drive system. Working vehicle 1400 includes an engine 1402 having a vertical output shaft 1404. Engine 1402 delivers drive power to a vertical input shaft 1405 of a rear transaxle 1406 through a pulley-belt combination 1408. As would be evident to one of skill in the art, alternative drive trains, such as mechanical shafts, may be employed as alternatives to pulley-belt combination 1408. Rear transaxle 1406 is a drive system combining an IHT (not shown) with any of the bi-directional overrunning clutch embodiments (200, 500, 900, and 1500) described herein. Rear transaxle 1406 serves to drive rear wheels 1410.

Working vehicle 1400 further includes a front transaxle 1412. Front transaxle 1412 is a drive system combining a hydraulic motor 1418 with any of the bi-directional overrunning clutch embodiments (200, 500, 900, and 1500) described herein. Front transaxle 1412 serves to drive front wheels 1414. In the embodiment shown, hydraulic motor 1418 of front transaxle 1412 is fluidly connected to and driven by the IHT of rear transaxle 1406 through hydraulic fluid lines 1416. As such, hydraulic fluid lines 1416 serve as a drive train between rear transaxle 1406 and front transaxle 1412. A similar drive system is described in U.S. Pat. No. 6,845,837, which is hereby incorporated in its entirety by reference thereto. Alternative drive trains between front and rear transaxles, such as the mechanical shaft drive train described in U.S. Pat. No. 6,902,017, may also be used. The disclosure of U.S. Pat. No. 6,902,017 is also hereby incorporated in its entirety by reference thereto.

FIG. 15 is a sectional view of a bi-directional overrunning clutch 1500 in accordance with an alternative embodiment. Bi-directional overrunning clutch 1500 includes an input gear 1502, having gear teeth 1504 along its periphery. A roller assembly 1510 is disposed within input gear 1502. Hubs 1512 are disposed within roller assembly 1510 and coupled to left and right shaft segments 112L, 112R. Rollers 1514 are disposed within roller assembly 1510 and form a wedging engagement with a cam surface of input gear 1502 when input gear 1502 is rotated.

A pair of clutch covers 1513 are disposed on the ends of roller assembly 1510 and fastened to roller assembly 1510 via bolts 1528. While the embodiment depicted employs bolts 1528, alternative fastening means may be used. Clutch covers 1513 extend over at least a portion of hubs 1512 and roller assembly 1510. In one embodiment, clutch covers 1513 have curved end portions 1575 that extend over a shoulder portion 1577 of input gear 1502. In the embodiment shown, a pair of friction members 1579 are disposed along the inner corner of the curved ends 1575 of clutch covers 1513. Clutch covers 1513 form an oil reservoir 1516 within bi-directional overrunning clutch 1500. Lubrication holes 1530 are formed within clutch covers 1513 to allow for the transfer of oil between oil reservoir 1516 and an oil sump 1532 formed by the upper housing portion 1501U and lower housing portion 1501L, wherein bi-directional overrunning clutch 1500 is mounted.

Roller assembly 1510 differs from any of the previously described roller assemblies in that roller assembly 1510 lacks springs. Instead, a pair of friction members 1518 are disposed between clutch covers 1513 and respective hubs 1512. As such, in operation torque is transmitted from input gear 1502 to roller assembly 1510 (via wedged engagement of rollers 1514), then to clutch covers 1513 through fastening bolts 1528, and ultimately to hubs 1512 and drive shaft segments 112L, 112R. However, when one shaft segment must rotate faster than the roller assembly 1510, or faster than the opposite shaft segment, the frictional force between the hubs 1512 and the friction members 1518 will be overcome, and one hub 1512 will be allowed to freely rotate faster than the roller assembly 1510.

FIG. 16 is a sectional plan view of a transaxle incorporating the bi-directional overrunning clutch of FIG. 15. Bi-directional overrunning clutch 1500 is disposed between left and right shaft segments 112L, 112R. In operation, rotation of bi-directional overrunning clutch 1500 transmits rotary motion to left and right shaft segments 112L, 112R, and thus to left and right wheels. Rotary motion is transmitted to bi-directional overrunning clutch 1500 through gear teeth 1504 along the outer periphery of input gear 1502. In the embodiment shown, gear teeth 1504 are configured to mate with intermediate shaft 1640. Intermediate shaft 1640 is then drivingly coupled to the output shaft 1624 of hydraulic motor 1622, which in turn is driven by hydraulic pump 1630.

In one embodiment, the transaxle of FIG. 16 is assembled by providing a housing, which is split between an upper housing portion 1501U and a lower housing portion 1501L. An integrated IHT is mounted on the upper housing portion 1501U, wherein the IHT includes a hydraulic motor 1622 and a hydraulic pump 1630. Bi-directional overrunning clutch 1500 is mounted on support projections 1690 (or bearing supports) of upper housing portion 1501U. Bi-directional overrunning clutch 1500 is then coupled to output shaft 1624 of the hydraulic motor 1622 via a drive train. Axle shaft segments 112L, 112R are then inserted into bi-directional overrunning clutch 1500 to engage with hubs 1512. Finally, lower housing portion 1501L is attached to upper housing portion 1501U. The transaxle is then turned over and mounted onto a working vehicle such as the mower tractor of FIG. 14. Assembly steps also include inserting oil into sump 1532 formed by the upper and lower housing portions.

While various embodiments have been described above, it should be understood that they have been presented by way of example and not limitation. For example, the bi-directional overrunning clutch embodiments (200, 500, 900, and 1500) have been described in combination with IHT and mechanical transmissions. However, the described clutches may be used in combination with any transmission or transaxle configuration known in the art. As such, the embodiments presented herein serve only to enable one of skill in the art to make and use the invention. Thus, the present invention should not be limited by any of the above described exemplary embodiments, but should be defined only in accordance with the following claims and their equivalents. All cited patent documents and publications in the above description are incorporated in their entirety herein by reference.

What is claimed is:

1. A transaxle, comprising:
    a housing;
    a hydrostatic transmission disposed within the housing, the transmission including a hydraulic motor and a hydraulic pump; and
    a bi-directional overrunning clutch disposed within the housing and coupled to an output shaft of the hydraulic motor, wherein the bi-directional overrunning clutch includes:
        an input gear having a central opening;
        a roller assembly disposed within the central opening of the input gear, wherein the roller assembly includes a plurality of rollers for selective engagement with the input gear;
        a pair of hubs, each disposed at least partially within the roller assembly;
        a pair of clutch covers, each disposed at either ends of the roller assembly and each coupled directly to the roller assembly, wherein each clutch cover extends over at least a portion of a respective one of the hubs; and
        a pair of friction members, wherein a respective one of the friction members is disposed between a respective one of the hubs and a respective one of the clutch covers; and
    a pair of shaft segments of a primary drive axle, each shaft segment coupled to a respective one of the hubs,
    wherein at least one of the clutch covers includes a lubrication hole.

2. The transaxle of claim 1, wherein the housing includes an oil sump.

3. The transaxle of claim 1, wherein the clutch covers form an internal oil reservoir for the bi-directional overrunning clutch.

4. The transaxle of claim 1, wherein the clutch covers are bolted to the roller assembly.

5. The transaxle of claim 1, wherein the clutch covers extend over a portion of the input gear.

6. The transaxle of claim 5, further comprising a second pair of friction members, each disposed between a respective one of the clutch covers and the input gear.

7. The transaxle of claim 1, wherein the clutch covers each include a respective curved end that each extend over a respective shoulder portion of the input gear.

8. The transaxle of claim 7, further comprising a second pair of friction members, each disposed between a respective one of the clutch covers and the input gear at an inner corner of the curved end of the respective one of the clutch covers.

9. The transaxle of claim 1, wherein the housing is split between an upper housing portion and a lower housing portion.

10. The transaxle of claim 9, wherein the bi-directional overrunning clutch is mounted on the upper housing portion.

11. The transaxle of claim 9, wherein the bi-directional overrunning clutch is mounted on bearing supports in the upper housing portion.

12. The transaxle of claim 1, wherein the output shaft of the hydraulic motor drives an intermediate shaft, and the intermediate shaft drives the input gear.

13. The transaxle of claim 1, wherein the lubrication hole transfers oil between an oil sump formed in the housing and an oil reservoir formed in the bi-directional overrunning clutch.

14. The transaxle of claim 1, wherein the lubrication hole is formed on a lateral side surface of the at least one clutch cover.

15. The transaxle of claim 1, wherein the lubrication hole is formed on a lateral side surface of the at least one clutch cover a radial distance away from the shaft segments so that the lubrication hole is aligned with the plurality of rollers.

16. The transaxle of claim 1, wherein the lubrication hole is formed on a lateral side surface of the at least one clutch cover between the input gear and one of the pair of shaft segments.

* * * * *